United States Patent [19]

Irie et al.

[11] Patent Number: 4,540,279
[45] Date of Patent: Sep. 10, 1985

[54] AUTOMATIC EXPOSURE DEVICE

[75] Inventors: Yoichiro Irie, Suita; Yutaka Shigemura, Takarazuka; Satoshi Namba, Ibaraki, all of Japan

[73] Assignee: Mita Kogyo Kabushiki Kaisha, Osaka, Japan

[21] Appl. No.: 635,028

[22] Filed: Jul. 27, 1984

[30] Foreign Application Priority Data

Jul. 30, 1983 [JP] Japan .................. 58-139962

[51] Int. Cl.$^3$ .............................................. G03B 27/72
[52] U.S. Cl. ..................................................... 355/69
[58] Field of Search .................................... 355/67–69, 355/14 E

[56] References Cited

U.S. PATENT DOCUMENTS

| 3,764,210 | 10/1973 | Nakamura | 355/69 |
| 4,124,294 | 7/1978 | Nakamura | 355/69 |
| 4,124,295 | 11/1978 | Gardiner | 355/68 |
| 4,153,364 | 5/1979 | Suzuki et al. | 355/68 X |
| 4,161,363 | 7/1979 | Kahle | 355/69 X |
| 4,200,391 | 4/1980 | Sakamoto et al. | 355/68 X |
| 4,304,486 | 12/1981 | Cormier et al. | 355/14 D |
| 4,354,758 | 10/1982 | Futaki | 355/69 |
| 4,378,153 | 3/1983 | Nishimura et al. | 355/14 R |
| 4,383,758 | 5/1983 | Honda | 355/68 |
| 4,390,266 | 6/1983 | Uchida | 355/14 D |

FOREIGN PATENT DOCUMENTS 0092038 10/1983 European Pat. Off. .

Primary Examiner—L. T. Hix
Assistant Examiner—Della Rutledge
Attorney, Agent, or Firm—Beveridge, DeGrandi & Weilacher

[57] ABSTRACT

An automatic exposure device wherein the quantity of light from an exposure lamp is detected by lamp light quantity detecting means, while the reflected light from a region of a document located forwardly of a region of the document being exposed is received by density detecting means, the output signal from said lamp light quantity detecting means being used as an input by reference signal producing means which produces a reference signal, the output signal from said density detecting means and the reference signal being used as inputs by correcting means which corrects the output signal from the density detecting means in accordance with an increase in the quantity of light from the lamp, the output signal from said correcting means being used as an input by lamp control means which controls conducting-angle of the exposure lamp.

8 Claims, 8 Drawing Figures (1)

(2)

(3)

24' 23' 24' 23'

AUTOMATIC EXPOSURE DEVICE

BACKGROUND OF THE INVENTION

The present invention relates to an automatic exposure device used in such image forming apparatuses as electrostatic copying machines and more particularly it relates to an automatic exposure device for image forming apparatuses wherein a document is irradiated by an exposure lamp and the reflected light from the document is condensed to form an image corresponding to the document image, said automatic exposure device being adapted to control the power of the exposure lamp accurately in accordance with the density of the document.

In an electrostatic copying machine, which is a kind of image forming apparatus, because of the necessity of obtaining copies having optimum image quality with respect to a wide variety of documents to be copied, it has been common practice for the operator to visually estimate the density of a document and accordingly manipulate a density adjusting knob installed on an operating section so as to change the exposure.

However, the above method relying on the operator's visual estimation is inefficient or such visual estimation varies with the individual, thus posing a problem that copies having optimum image quality cannot always be obtained.

Therefore, in recent years there has been employed a system for detecting the intensity of reflected light from a document and automatically control the exposure for the document by the resulting detection signal.

An electrostatic copying machine using this system has a detecting element adapted to detect the intensity of the reflected light from a document irradiated by an exposure lamp, and the position on the document at which the reflected light intensity is detected by the detecting element is located at a position spaced by an amount corresponding to the distance traveled by the document or exposure lamp during the rise response time of the exposure lamp to be controlled, that is, at a position upstream of the exposure region of the document as viewed in the direction of travel of the document (a position downstream as viewed in the direction of travel of the exposure lamp). And the applied voltage on the exposure lamp is controlled by the quantity of light (reflected light) received by said detecting element.

In such system, however, because of the reading of the document density, the quantity of light of the exposure lamp which should originally be maintained constant is varied in accordance with the output of the detecting element receiving the reflected light from the document, the following problem arises.

For example, suppose a case where a document 4 having a high density region 23 and a low density region 24 is to be copied, as shown in FIG. 6. In addition, the corresponding position on the document 4 being detected by the detecting element is shown by the reference character 21a, while the position corresponding to the exposure region of the document 4 is shown by the reference character 18a. First, in the state of the document 4 assuming the position of FIG. 6(a) as a result of exposure movement, the quantity of light incident on the detecting element, corresponding to the low density region 24 of the document 4, is high, as shown in FIG. 7(1), so that the voltage to be applied to the exposure lamp is controlled to be low, as shown in FIG. 7(2), and hence the output light quantity of the exposure lamp is also small, as shown in FIG. 7(3). Next, in the state of the document moved to the position of FIG. 6(b), the quantity of light incident on the detecting element is small correspondingly to the density of the high density region 23 of the document 4, so that the lamp voltage is controlled to be high. However, the output light quantity of the exposure lamp lags in response by an amount corresponding to the rise time. As the light quantity of the exposure lamp increases, so does the quantity of light incident on the detecting element, so that the lamp voltage is controlled to be low. When the lamp voltage is controlled to be low, the output light quantity of the lamp is also controlled to be low, but there is a fall time which lasts for the same period as said rise time. Thus, because of a lag in response between the detecting element and the exposure lamp due to the rise and fall times of the latter, the copy of the document 4, as shown in FIG. 8, is striped with alternating high and low density regions 23' and 24' corresponding to the changes in the output light quantity of the exposure lamp shown in FIG. 7(3). In addition, the quantity of light incident on the detecting element and the output light quantity of the exposure lamp, whose actual changes are analog, are represented in simplified form in FIG. 7 for convenience' sake.

As an approach to such problem, it may be easily conceived to radiate light of predetermined quantity, separately from the exposure lamp, toward the document 4, to receive the reflected light by a light detecting element to detect the density of the document to thereby control the power of the exposure lamp. With such arrangement, however, it would be necessary to protect the detecting element from the influence of the light from the exposure lamp, in which case, then, it would be unavoidable to arrange the detecting element so that it detects the density of a portion of the document which is sufficiently away from the region of the document being exposed to the light from the exposure lamp. Then, it would be impossible to control the power of the exposure lamp accurately in accordance with the density of the document.

An object of this invention is to provide a novel automatic exposure device for use with image forming apparatuses, which ensures that irrespective of the degree of density of the background of a document, the background of the document image is kept in a clear state free from fogs and fringes to thereby improve the quality of images.

An automatic exposure control device according to the present invention comprises lamp light quantity detecting means for detecting the light quantity of an exposure lamp, density detecting means which receives the reflected light from a region of a document located forwardly of a region of the document being exposed to detect the density of the firt region, reference signal producing means which uses as its input signal the output signal from said lamp light quantity detecting means to produce a reference signal, correcting means which uses as its inputs the output signal of the density detecting means and the reference signal to correct the output signal of the density detecting means correspondingly to an increase in the lamp light quantity, and lamp control means which uses as its input the output signal of the correcting means to control the conducting-angle of the exposure lamp.

The lamp light quantity detecting means, which is preferably one adapted to detect the quantity of light of the exposure lamp by directly receiving the light, may be one adapted to detect said quantity of light on the basis of the applied voltage on the exposure lamp.

The reference signal producing means may be one adapted to output the difference between the output signal and a preset predetermined signal. Alternatively, it may be one adapted to delay the output signal of the lamp light quantity detecting means by an amount corresponding to the response time of the exposure lamp and output the difference between said output signal and a preset predetermined signal.

DESCRIPTION OF THE PREFERRED EMBODIMENTS

Figure 1:
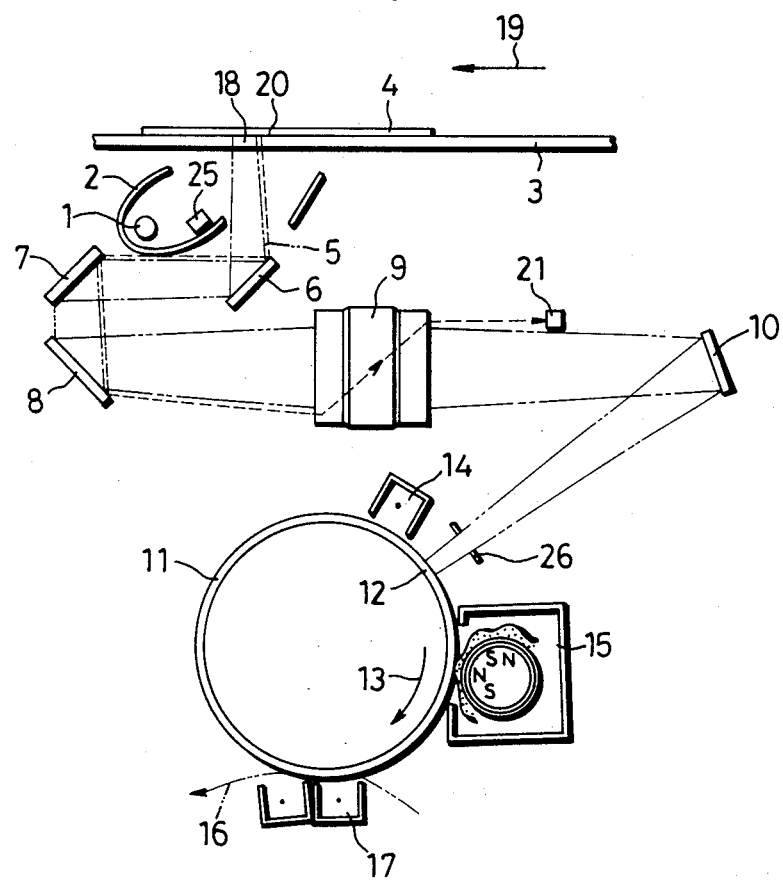
FIG. 1 is a schematic sectional view of an electrostatic copying machine forming the basis of the present invention.

FIG. 1 is a schematic sectional view of an electrostatic copying machine forming the basis of the invention and having an automatic exposure device incorporated therein, illustrating the type adapted to reciprocate a transparent platen which supports a document. An exposure lamp 1 is provided with a reflecting mirror 2, and the light from said exposure lamp 1 is transmitted through a transparent platen 3 to irradiate a document 4 placed on said transparent platen 3. Thus, a document image is reflected by reflecting mirrors 6, 7, and 8 to pass through a lens 9 and again reflected by a reflecting mirror 10 and is finally formed on an exposure region 12 of a photoreceptor drum 11. The photoreceptor drum 11 is rotatively driven in the direction of arrow 13, is electrically charged upstream of the exposure region 12 by a corona discharger 14, and is exposed to the light at the exposure region 12, the electrostatic latent image formed by this exposure being visualized into a toner image by a magnetic brush development device 15 and transferred by the action of a transfer corona discharger 17 onto a copying paper sheet which travels through the path for the copying paper sheet. The toner image transferred onto the copying paper sheet is fixed by a subsequent fixing device. In this way a copying operation for the document 4 is performed. The region of the document 4 whose image is being formed on the exposure region 12 of the photoreceptor 11 is denoted by the reference character 18.

An arrangement for automatic exposure comprises a first detecting element 25 disposed at a predetermined position in said reflecting mirror 2 for directly receiving the light from the exposure lamp 1 to detect the light quantity, a second detecting element 21 disposed at a predetermined position downstream of the lens 9 with respect to an optical path 5 for receiving the reflected light from a position 20 whcih is spaced forwardly, i.e., downstream from the exposure region 18 of the document 4 as viewed in the direction of movement of the transparent platen 3 by a distance to be traveled by the transparent platen 3 during the rise response time of the exposure lamp 1, and a slit member 26 disposed between the reflecting mirror 10 and the exposure region 12 of the photoreceptor drum 11 for guiding only the reflected light from the position 18 to the exposure region 12.

Figure 2:
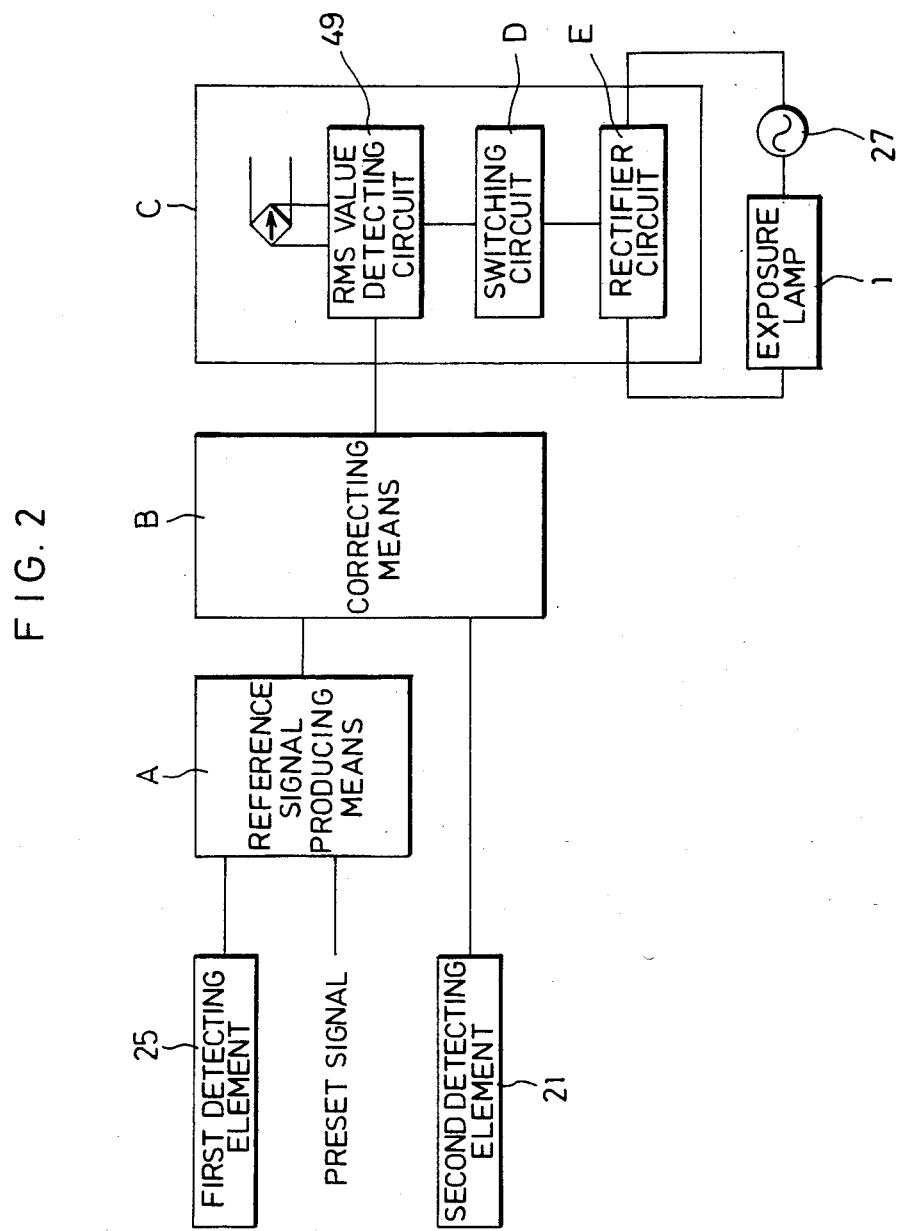
FIG. 2 is a block diagram of an automatic exposure device.

FIG. 2 is a block diagram of the automatic exposure device of the present invention.

It comprises reference signal producing means A using as its inputs the output signal from the first detecting element 25 serving as lamp light quantity detecting means and a preset signal, correcting means B using as its inputs a reference signal and the output signal from the second detecting element 21 serving as density detecting means, lamp control means C using as its input the output signal from the correcting means B, and the exposure lamp 1 to be controlled the conducting-angle by the lamp control means C.

The lamp control means C comprises an RMS (root mean square) value detecting circuit 49 using as its inputs the rectified output voltage of an AC source and the output signal from the correcting means B, a switching circuit D using as its input the output signal from said RMS value detecting circuit 49, and a rectifier circuit E adapted to operate with the conducting timing of the switching circuit D.

Figure 3:
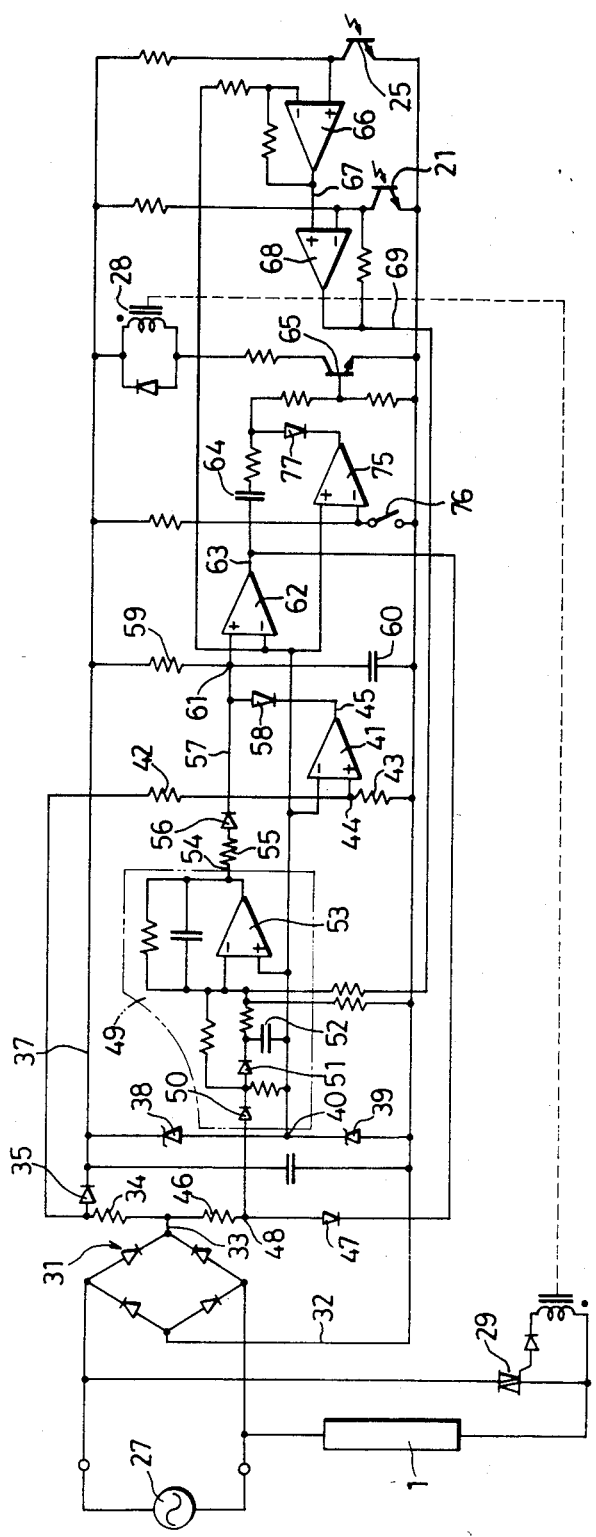
FIG. 3 is an electric circuit diagram illustrating an embodiment of an automatic exposure device.
Figure 4:
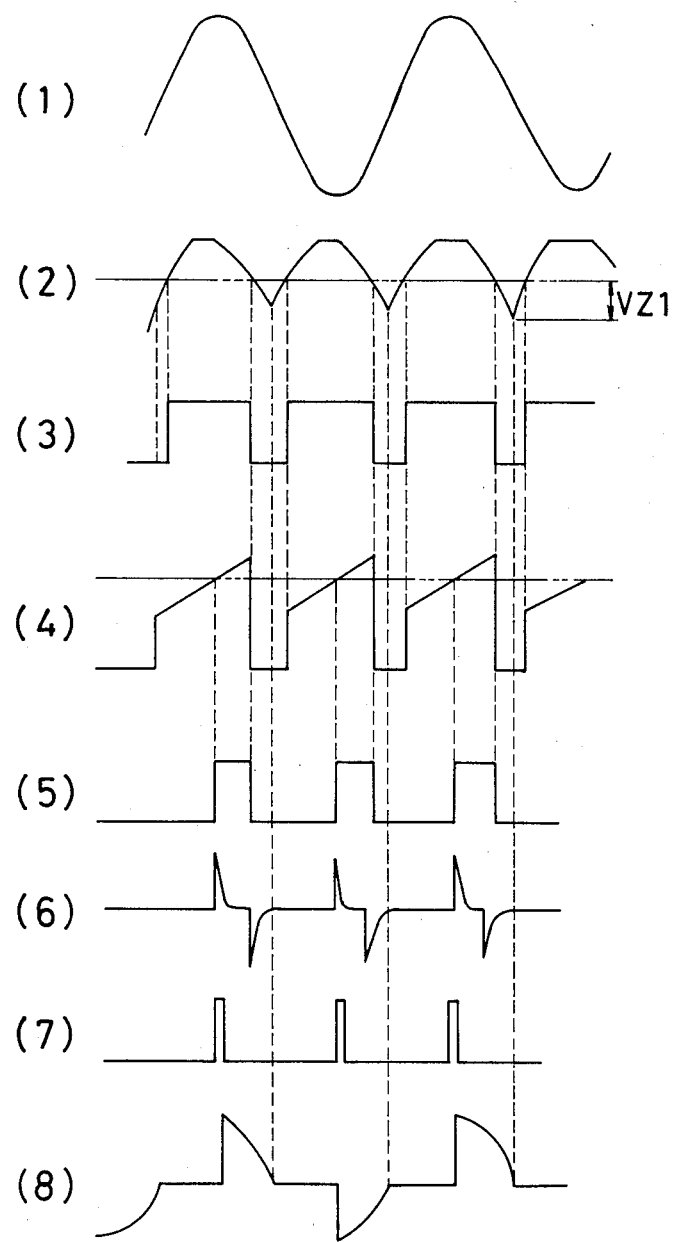
FIG. 4 is a waveform diagram for explaining the operation of the embodiment shown in FIG. 3.

FIG. 3 is an electric circuit diagram of an embodiment of the invention. The output light quantity of the exposure lamp 1 is detected by the first detecting element 25 (see FIG. 1) disposed closely adjacent to the exposure lamp 1. The AC power from a commercial AC source 27 is controlled of its conducting-angle through a triac 29 adapted to be fired by a pulse from a pulse transformer 28. The waveform of this AC voltage is as shown in FIG. 4(1). A full-wave rectifier circuit 31 full-wave-rectifies the output from the AC source 27 to feed its output between lines 32 and 33. The output from the lines 32,33 is fed to a line 37 through a resistor 34 and a diode 35. Reverse-polarity-connected in series between the lines 32 and 37 are zener diodes 38 and 39, and the output at their connecting point 40 is given to one input of a comparator circuit 41. The voltage from the full-wave rectifier circuit 31 via the line 33 and resistor 34 is divided by resistors 42 and 43, one divisional voltage serving as the other input to the comparator circuit 41.

The waveform of the voltage thus divided by the divider resistors 42 and 43 and appearing at a connecting point 44 is as shown in FIG. 4(2). The zener voltage of the zener diode 39 is shown by the reference character VZ1 in FIG. 4(2). The comparator circuit 41 is adapted to maintain a line 45 at high level for the period during which the voltage at the connecting point 44 exceeds the zener voltage VZ1, while for the remaining period it maintains said line at low level by grounding it. The waveform in the line 45 is shown in FIG. 4(3).

Connected between the line 33 and a line 63 to be later described are a resistor 46 and a diode 47, and the output at their connecting point 48 is fed to the RMS value detecting circuit 49. In the RMS value detecting circuit 49, the output from the connecting point 48 charges a capacitor 52 through diodes 50 and 51. The RMS value detecting circuit 49 functions to produce a DC voltage which is proportional to the AC voltage impressed on the lamp 1. The RMS value detecting circuit 49 transfers its output to a line 54, from which it is transferred to a line 57 through a resistor 55 and a diode 56.

The line 57 is connected to a line 45 through a diode 58. This line 57 is connected to a connecting point 61 between a resistor 59 and a capacitor 60 which are connected between the lines 32 and 37. The voltage waveform at the connecting point 61 is as shown in FIG. 4(4). When the line 45 assumes its low level, this connecting point allows the capacitor to discharge until its voltage is zero. When the line 45 assumes its high level, the capacitor 60 increases its output gradually with time. The electric discharge due to the diode 58 stops, whereupon the capacitor 60 is rapidly charged with a voltage which is in agreement with the RMS voltage from the resistor 55 and diode 56, and then the capacitor 60 is gradually charged through a resistor 59, so that its output voltage increases with time.

A comparator circuit 62 receives at its one input the output at the connecting point 61 and at its other input the voltage VZ1 at the connecting point 40. As a result, the comparator circuit 62 renders the line 63 high level for the period during which the voltage at the connecting point 61 exceeds the voltage VZ1. When the line 63 is at low level, the diode 47 is rendered conductive, while when it is at high level, the diode 47 is cut off, so that the output at the connecting point 48 is given to the RMS value detecting circuit 49. The signal from the line 63, shown in FIG. 4(5), is differentiated by a differentiating capacitor 64, and the resulting differentiated pulses, as shown in FIG. 4(6), are given to the base of a transistor 65. The transistor 65 is series-connected to the primary winding of the pulse transformer 28, the output from the secondary winding being used for firing the triac 29.

The transistor 65 is rendered conductive, as shown in FIG. 4(7), in response to a pulse from the differentiating capacitor 64. As a result, the triac 29 is fired, whereby the voltage shown in FIG. 4(8) is impressed on the exposure lamp 1; thus the latter is controlled of its conducting-angle.

When the output voltage of the AC source 27 varies to become, e.g., high, the voltage at the connecting point 48 rises, whereby the voltage on the line 54 lowers. As a result, the width of the pulses shown in FIG. 4(5), which are transferred to the line 63 from the comparator circuit 62, is reduced. As a result, the conducting-angle of the triac 29 is reduced. In this way, the light quantity of the exposure lamp 1 is maintained constant.

The output from the detecting element 25 is given to one input of an operational amplifier circuit 66. The other input of the operating amplifier circuit 66 is given the voltage VZ1. The operational amplifier circuit 66 produces on a line 67 a voltage which corresponds to the difference between the voltage VZ1 and voltage value which corresponds to the impedance of the detecting element 25. Therefore, if the light quantity received by the detecting element 25 increases, its impedance decreases and hence the voltage applied to the operational amplifier circuit 66 decreases. Thus, the voltage on the line 67 decreases. This voltage on the line 67 is received by an operational amplifier circuit 68 which uses it as a reference voltage. The operational amplifier circuit 68 is given the voltage provided by the detecting element 21. The operational amplifier circuit 68 produces on a line 69 a voltage corresponding to the difference between the voltage on the line 67 and the voltage corresponding to the impedance of the detecting element 21. Thus, if the quantity of light received by the light receiving element 21 increases, the voltage on the line 67 decreases; therefore, unless a greater quantity of light is given to the light receiving element 21, it is impossible to deliver a signal of the same level as before to the line 69.

If the quantity of light received by the light receiving element 21 increases, the impedance thereof decreases, and hence the voltage delivered to the line 69 increases. Thus, the voltage delivered to the line 54 of the RMS value detecting circuit 49 decreases. Therefore, in the comparator circuit 62, it takes a longer time for the voltage on the connecting point 61 to reach the voltage VZ1. As a result, the conducting-angle of the triac 29 becomes smaller and the output light quantity of the exposure lamp 1 decreases.

Since the detecting element 21 which detects the density of a document on the basis of the output from the detecting element which directly receives the light from the exposure lamp 1 is designed not to operate in the same way as before unless it receives a greater quantity of light as the quantity of light to be received by the detecting element 25 increases, irrespective of the intensity of the density of the document it becomes possible to obtain sharp image quality with the background and document image distinctly defined.

Figure 5:
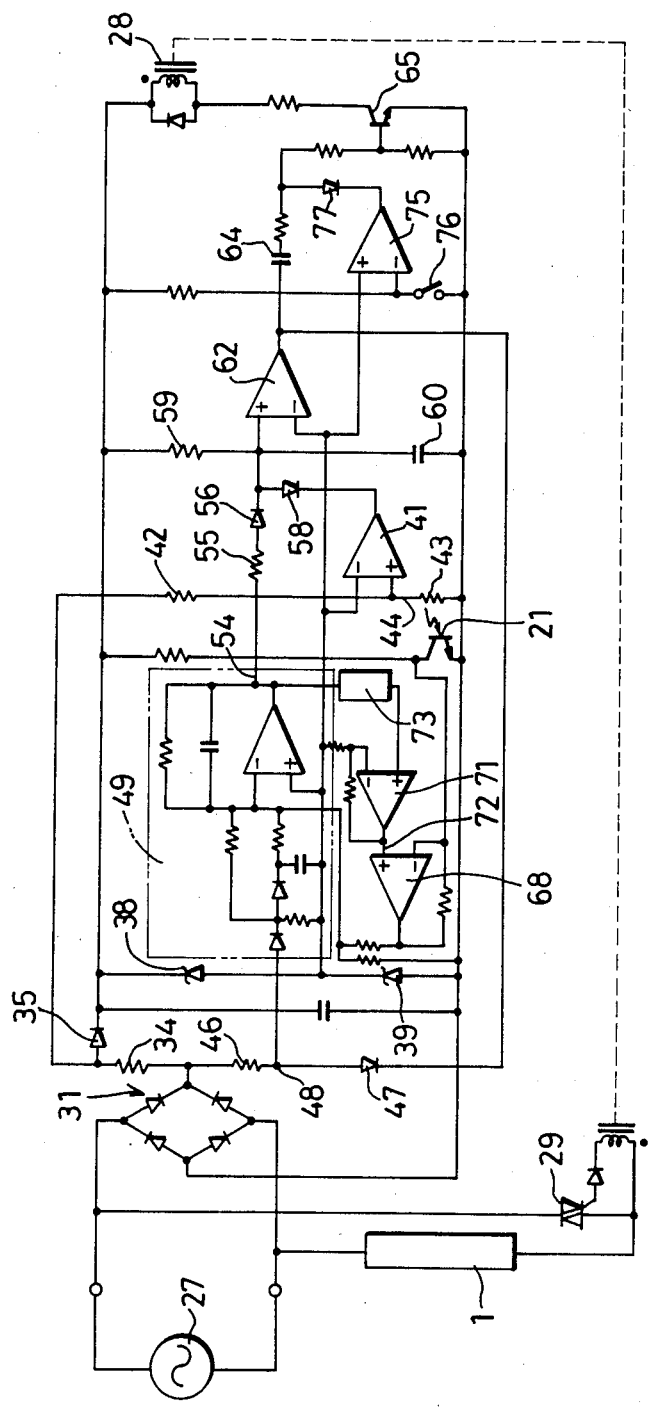
FIG. 5 is an electric circuit diagram showing another embodiment of the invention.
Figure 6A:
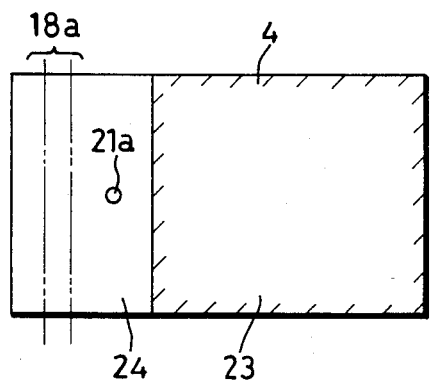
FIG. 6 is a plan view of a document for explaining the operation of the prior art.
Figure 6B:
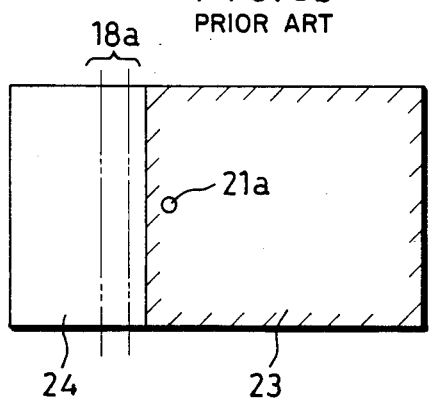
Figure 7:
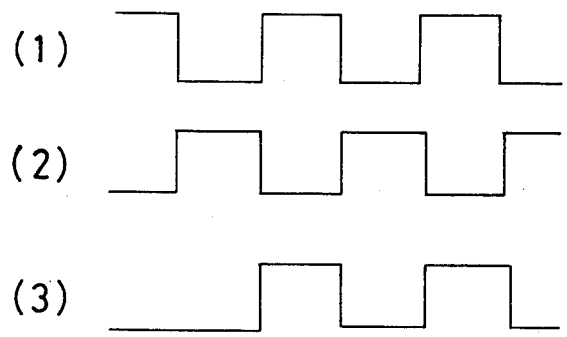
FIG. 7 is a waveform diagram for explaining the operation of the prior art.
Figure 8:
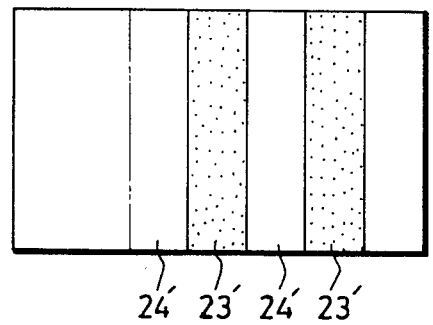
FIG. 8 is a plan view of the document for explaining the operation of the prior art.

FIG. 5 is an electric circuit diagram of another modification of the invention. This embodiment is similar to the preceding one, with like parts designated by like reference characters. What is to be noted is that there is provided a single detecting element 21, whose output is given to one input of the operational amplifier circuit 68. The other input of the operational amplifier circuit 68 is given the output from an operational amplifier circuit 71 through a line 72. The operational amplifier circuit 71 is given a signal, delayed by a delaying circuit 73, from the line 54 of the RMS value detecting circuit 49. The delaying circuit 73 functions to delay the output of the line 54 by an amount corresponding to the characteristic of the exposure lamp 1. The other input of the operational amplifier circuit 71 is given the voltage VZ1. Therefore, the signal delivered from the RMS value detecting circuit 49 to the line 54 and serving to render constant the conducting-angle of the exposure lamp is delayed by the delaying circuit 73, and the reference signal to be compared with the output from the detecting element 21 on the basis of the output from the delaying circuit 73 is changed. When the quantity of light from the exposure lamp 1 increases, the detecting element 21 will not operate in the same way as before unless it receives a greater quantity of light.

In addition, in the two embodiments described above, a comparator circuit 75 is installed. One input of this comparator circuit 75 is given the voltage VZ1 and the other is given a low level signal through a switch 76. During said control of the exposure lamp 1, the switch 76 is kept opened. When the switch 76 is closed, the output of the comparator circuit 75 takes the low level and hence the base of the transistor 65 is rendered low through a diode 77, with the transistor 65 remaining cut off. In this way, the exposure lamp 1 can be kept deenergized.

The present invention is applicable not only to a transfer type electrostatic copying machine in which the transparent platen 3 is movable, as described above, but also to a copying machine of the type in which the transparent platen 3 for mounting the document 4 thereon is stationary and the exposure lamp 1 is movable (in this case, the term "forwardly of the exposure region 18 of the document" means "downstream as viewed in the direction of travel of the exposure lamp 1"). The invention is also applicable to other image forming apparatuses such as facsimile systems.

What is claimed is:

1. An automatic exposure device comprising lamp light quantity detecting means for detecting the light quantity of an exposure lamp, density detecting means which receives the reflected light from a region of a document located forwardly of a region of the document being exposed to detect the density of the first region, reference signal producing means which uses as its input signal the output signal from said lamp light quantity detecting means to produce a reference signal, correcting means which uses as its inputs the output signal of the density detecting means and the reference signal to correct the output signal of the density detecting means correspondingly to an increase in the lamp light quantity, and lamp control means which uses as its input the output signal of the correcting means to control the conducting-angle of the exposure lamp.

2. An automatic exposure device as set forth in claim 1, wherein the lamp light quantity detecting means is adapted to receive the light from the exposure lamp to convert it directly into an electric signal, thereby detecting the light quantity.

3. An automatic exposure device as set forth in claim 1, wherein the lamp light quantity detecting means is adapted to detect the light quantity on the basis of the controlled power of the exposure lamp.

4. An automatic exposure device as set forth in claim 1, wherein the reference signal producing means is adapted to output the difference between the output signal of the lamp light quantity detecting means and a preset predetermined signal.

5. An automatic exposure device as set forth in claim 1, wherein the reference signal producing means is adapted to delay the output signal of the lamp light quantity detecting means by an amount corresponding to the response time of the exposure lamp and to output the difference between it and a preset predetermined signal.

6. Au automatic exposure device as set forth in claim 1, wherein the correcting means is adapted to output the difference between the output signal of the density detecting means and the reference signal.

7. An automatic exposure device as set forth in claim 1, wherein the lamp control means comprises an RMS value detecting means which uses as its inputs a rectified output voltage from an AC voltage and the output signal of the correcting means, a switching circuit adapted to be rendered conductive only when the output signal of the RMS value detecting means exceeds a predetermined signal, and a rectifier circuit adapted to be actuated with the conducting timing of the switching circuit so as to control the conducting time of the exposure lamp.

8. An automatic exposure device as set forth in claim 1, wherein a front region is a region to be exposed upon the lapse of the response time of the exposure lamp.

* * * * *